US011059397B1

(12) United States Patent
Yamakita (10) Patent No.: US 11,059,397 B1
(45) Date of Patent: Jul. 13, 2021

(54) RECLINER (71) Applicant: TOYOTA BOSHOKU KABUSHIKI KAISHA, Aichi (JP)

(72) Inventor: Yuta Yamakita, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/056,294

(22) PCT Filed: May 14, 2019

(86) PCT No.: PCT/JP2019/019113
§ 371 (c)(1),
(2) Date: Nov. 17, 2020

(87) PCT Pub. No.: WO2019/225403
PCT Pub. Date: Nov. 28, 2019

(30) Foreign Application Priority Data

May 23, 2018 (JP) .............................. JP2018-099023

(51) Int. Cl.
*B60N 2/22* (2006.01)
*B60N 2/235* (2006.01)

(52) U.S. Cl.
CPC ............. *B60N 2/224* (2013.01); *B60N 2/236* (2015.04); *B60N 2/2356* (2013.01); *B60N 2/2362* (2015.04)

(58) Field of Classification Search
CPC ...... B60N 2/236; B60N 2/2362; B60N 2/224; B60N 2/2356; B60N 2/235; B60N 2/2227
USPC ............................................... 297/367 P, 366
See application file for complete search history.

(56) References Cited

U.S. PATENT DOCUMENTS

| 6,520,583 | B1 * | 2/2003 | Bonk ..................... | B60N 2/236 192/223.1 |
| 8,414,077 | B2 * | 4/2013 | Reubeuze ............ | B60N 2/2362 297/367 P |
| 8,641,146 | B2 * | 2/2014 | Suzuki ................. | B60N 2/2362 297/367 R |
| 8,668,269 | B2 * | 3/2014 | Jaudouin .............. | B60N 2/2362 297/367 P |

(Continued)

FOREIGN PATENT DOCUMENTS

CN 106240408 A * 12/2016
JP 2010-213839 9/2010

OTHER PUBLICATIONS

Search Report issued in International Patent Application No. PCT/JP2019/019113, dated Aug. 6, 2019.

(Continued)

*Primary Examiner* — Milton Nelson, Jr.
(74) *Attorney, Agent, or Firm* — Greenblum & Bernstein, P.L.C.

(57) ABSTRACT

A recliner according to one aspect of the present disclosure includes a plate-shaped ratchet, at least one pawl, a plate-shaped guide member, and a ratchet seating portion. The ratchet seating portion is provided on the guide member to be positioned on an inner peripheral side of a second flange and between two guide walls adjacent to each other in a circumferential direction on the guide member. The ratchet seating portion protrudes toward the first flange of the ratchet and is configured to come into sliding contact with a tip of the first flange.

2 Claims, 6 Drawing Sheets

(56) References Cited

U.S. PATENT DOCUMENTS

2012/0086253 A1* 4/2012 Nock .................. B60N 2/2356
297/354.12
2015/0321585 A1* 11/2015 McCulloch .......... B60N 2/2356
297/367 P

OTHER PUBLICATIONS

International Preliminary Report on Patentability (including English-translation of Written Opinion) issued in International Patent Application No. PCT/JP2019/019113, dated Nov. 24, 2020.

* cited by examiner

RECLINER

CROSS-REFERENCE TO RELATED APPLICATION

This international application claims the benefit of Japanese Patent Application No. 2018-099023 filed on May 23, 2018 with the Japan Patent Office. The entire disclosure of Japanese Patent Application No. 2018-099023 is incorporated in this international application by reference.

TECHNICAL FIELD

The present disclosure relates to a recliner for rotatably coupling a seatback to a seat cushion.

BACKGROUND ART

A recliner at least comprises, as described in Patent Document 1 mentioned below for example, a plate-shaped guide member fixed to a cushion frame, and a plate-shaped ratchet fixed to a back frame. The recliner rotatably couples the back frame to the cushion frame.

The ratchet has a protruding flange formed on the outer periphery of the ratchet, and the flange has serrations that mesh with serrations formed on pawls. The pawls are movable toward and away from the flange. The pawls are housed in a space between the guide member and the ratchet.

The guide member has guide walls. The guide walls guide the pawls to move in the radial direction of the guide member and restrict the movement of the pawls in the circumferential direction. The guide member and the ratchet are coupled by an outer peripheral ring.

The pawls are planar members housed in a space created between the ratchet and the guide member. The guide walls come into sliding contact with the end faces of the pawls, thereby guiding the movement of the pawls in the radial direction while restricting the movement of the pawls in the circumferential direction.

PRIOR ART DOCUMENT

Patent Document

Patent Document 1: Japanese Unexamined Patent Application Publication No. 2010-213839

SUMMARY OF THE INVENTION

Problems to be Solved by the Invention

It is desirable that the guide walls have a height that is, for example, half or more of the plate thickness of the pawls (hereinafter referred to as a first requirement). Since the ratchet forms the space for the pawls to be housed, it is desirable that the ratchet is spaced apart from the pawls to an extent not to interfere with the pawls (hereinafter referred to as a second requirement).

It is desirable that one aspect of the present disclosure can provide a recliner that can fulfill the above-described first requirement and the second requirement.

Means for Solving the Problems

A recliner according to one aspect of the present disclosure is configured to rotatably couple a seatback to a seat cushion.

The recliner comprises a plate-shaped ratchet, at least one pawl, a plate-shaped guide member, and a ratchet seating portion. The ratchet has a first flange on an outer periphery of the ratchet. The first flange is provided with a first protrusion-depression on an inner peripheral surface of the first flange. The at least one pawl has a second protrusion-depression that are meshable with the first protrusion-depression. The at least one pawl is configured to be movable between a meshed position and a separated position. The meshed position is where the at least one pawl meshes with the first protrusion-depression. The separated position is spaced apart from the meshed position.

The guide member has two or more guide walls and a second flange. The two or more guide walls are configured to come into sliding contact with the at least one pawl so as to guide a movement of the at least one pawl and so as to restrict the at least one pawl from moving in a circumferential direction. The second flange is provided on an outer periphery of the guide member and protrudes toward the ratchet. The ratchet seating portion protrudes toward the first flange and is configured to come into contact with a tip of the first flange. The ratchet seating portion is provided on the guide member to be positioned on an inner peripheral side of the second flange. The ratchet seating portion is provided between, among the two or more guide walls, two guide walls adjacent to each other in the circumferential direction.

The above-described recliner comprises the ratchet seating portion; and the ratchet is, thus, spaced apart from the at least one pawl to an extent not to interfere with the at least one pawl.

Since the ratchet is spaced apart from the at least one pawl, the two guide walls may have an increased height. Accordingly, the recliner may be able to fulfill the above-described first requirement and second requirement.

The ratchet seating portion is provided between two guide walls adjacent to each other in the circumferential direction; and, thus, its contact area with the first flange is reduced as compared to a configuration where a ratchet seating portion extends along the entire circumference. As a result, the above-described configuration reduces the slide resistance between the ratchet and the guide member.

The at least one pawl may comprise two or more pawls. The two or more pawls may be disposed at equal intervals in the circumferential direction. The two or more pawls may comprise a first pawl and a second pawl adjacent to the first pawl in the circumferential direction. The two or more guide walls may comprise a first guide wall configured to come into sliding contact with the first pawl, and a second guide wall disposed adjacent to the first guide wall and configured to come into sliding contact with the second pawl. The ratchet seating portion may be provided between the first guide wall and the second guide wall in the circumferential direction.

In the above-described recliner, the slide resistance may be further reduced between the ratchet and the guide member.

EXPLANATION OF REFERENCE NUMERALS

1 . . . recliner, 10 . . . guide member, 11 . . . plate portion, 12 . . . flange, 13 to 15 . . . protruding portion, 13A to 15B . . . guide wall, 13B . . . guide wall, 16A to 16C . . . ratchet seating portion, 20 . . . ratchet, 21 . . . plate portion, 22 . . . flange, 30 . . . outer peripheral ring, 41 to 43 . . . pawl

MODE FOR CARRYING OUT THE INVENTION

"Embodiments" described below are example embodiments that fall within the technical scope of the present disclosure. In other words, matters recited in the claims and the like are not limited to specific configurations, structures, and so on shown in the embodiments below.

In regard at least to a member or portion described with a reference numeral, at least one such a member or portion is provided unless there is a specifying term, such as "only one". In other words, two or more such members may be provided unless the number is specified by a term, such as "only one".

The present embodiments are examples of a recliner according to the present disclosure applied to a seat (hereinafter referred to as a vehicle seat) mounted on a vehicle, such as a car. Arrows and other marks indicating directions in the figures are provided for easy understanding of mutual relationships between the figures.

Accordingly, the present disclosure should not be limited by the directions in the figures. The directions shown in the figures are based on the direction of the vehicle seat according to the present embodiments that is assembled to a car.

First Embodiment

1. Overview of Recliner

Figure 1:
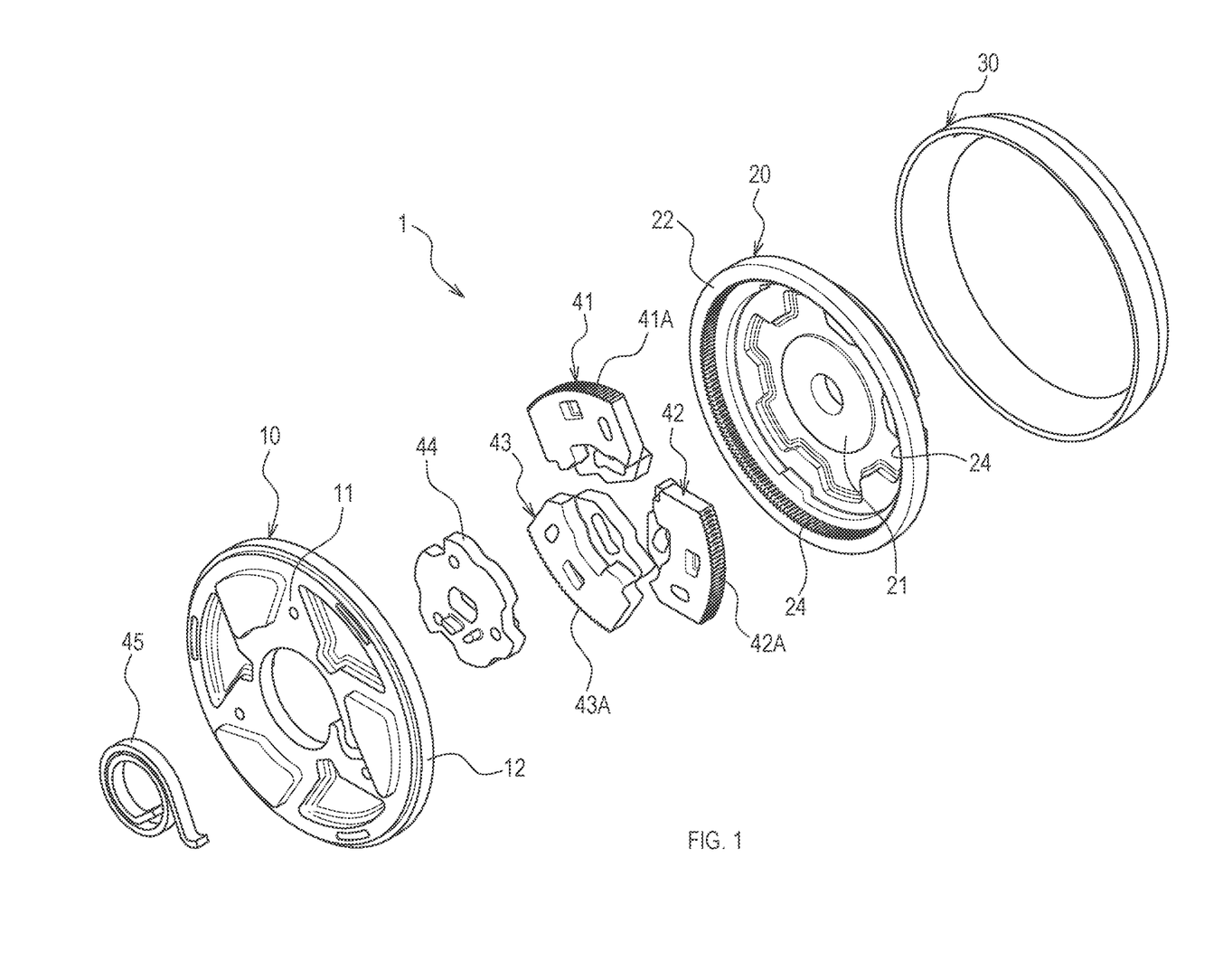
FIG. 1 is an exploded view of a recliner according to a first embodiment.

As shown in FIG. 1, a recliner 1 at least comprises, for example, a guide member 10, a ratchet 20, an outer peripheral ring 30, and pawls 41 to 43. In other words, the general configuration of the recliner 1 is the same as that of the invention described in the above-mentioned Patent Document 1.

The ratchet 20 is fixed to, for example, a back frame (not shown). The back frame is a member forming the framework of a seatback. The seatback supports the back of an occupant.

Figure 2:
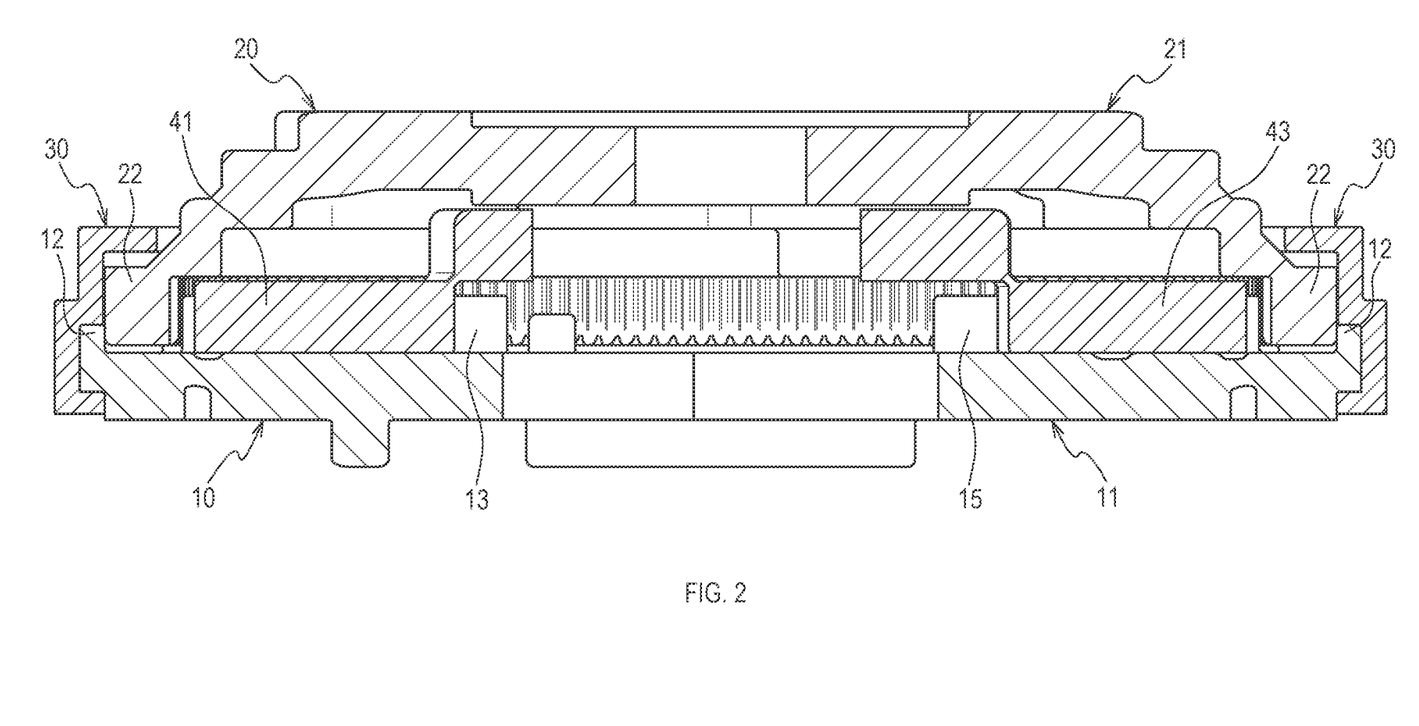
FIG. 2 is a diagram showing a structure of the recliner according to the first embodiment.

The ratchet 20 is a plate-shaped member including a disk-shaped plate portion 21 and a flange 22, As shown in FIG. 2, the plate portion 21 is disposed to face a plate portion 11 of the guide member 10 across a space.

The flange 22 is one example of the first flange of the present disclosure and is, as shown in FIG. 1, a protrusion extending from the entire outer periphery of the plate portion 21 toward the plate portion 11. The flange 22 is integrally formed with the plate portion 21 from a metal plate by plastic forming, such as press forming.

The guide member 10 is fixed to, for example, a cushion frame (not shown). The cushion frame is a member forming the framework of a seat cushion. The seat cushion supports the buttocks of the occupant.

As shown in FIG. 2, the guide member 10 is a plate-shaped member including a substantially disk-shaped plate portion 11 and the flange 12. The flange 12 is one example of the second flange of the present disclosure, and is a protrusion extending from the outer periphery of the plate portion 11 in a direction orthogonal to the plate portion 11.

The flange 12 is integrally formed with the plate portion 11 from a metal plate by plastic forming, such as press forming. The ratchet 20 is disposed on the inner peripheral side of the flange 12. Accordingly, the inner peripheral surface of the flange 12 and the outer peripheral surface of flange 22 can come into sliding contact with each other.

The guide member 10 and the ratchet 20 are coupled to each other by the outer peripheral ring 30. The outer peripheral ring 30 restricts separation of the guide member 10 from the ratchet 20 while allowing rotation of the guide member 10 relative to the ratchet 20.

As shown in FIG. 1, the inner peripheral surface of the flange 22 has serrations 24 that mesh with serrations 41A to 43A. The serrations 41A to 43A are provided to the respective pawls 41 to 43. Each of the pawls 41 to 43 is moved in the radial direction of the guide member 10 to approach and separate from the serrations 24. The serrations 24 correspond to one example of the first protrusion-depression of the present disclosure. Each of the serrations 41A to 43A corresponds to one example of the second protrusion-depression of the present disclosure.

Figure 3:
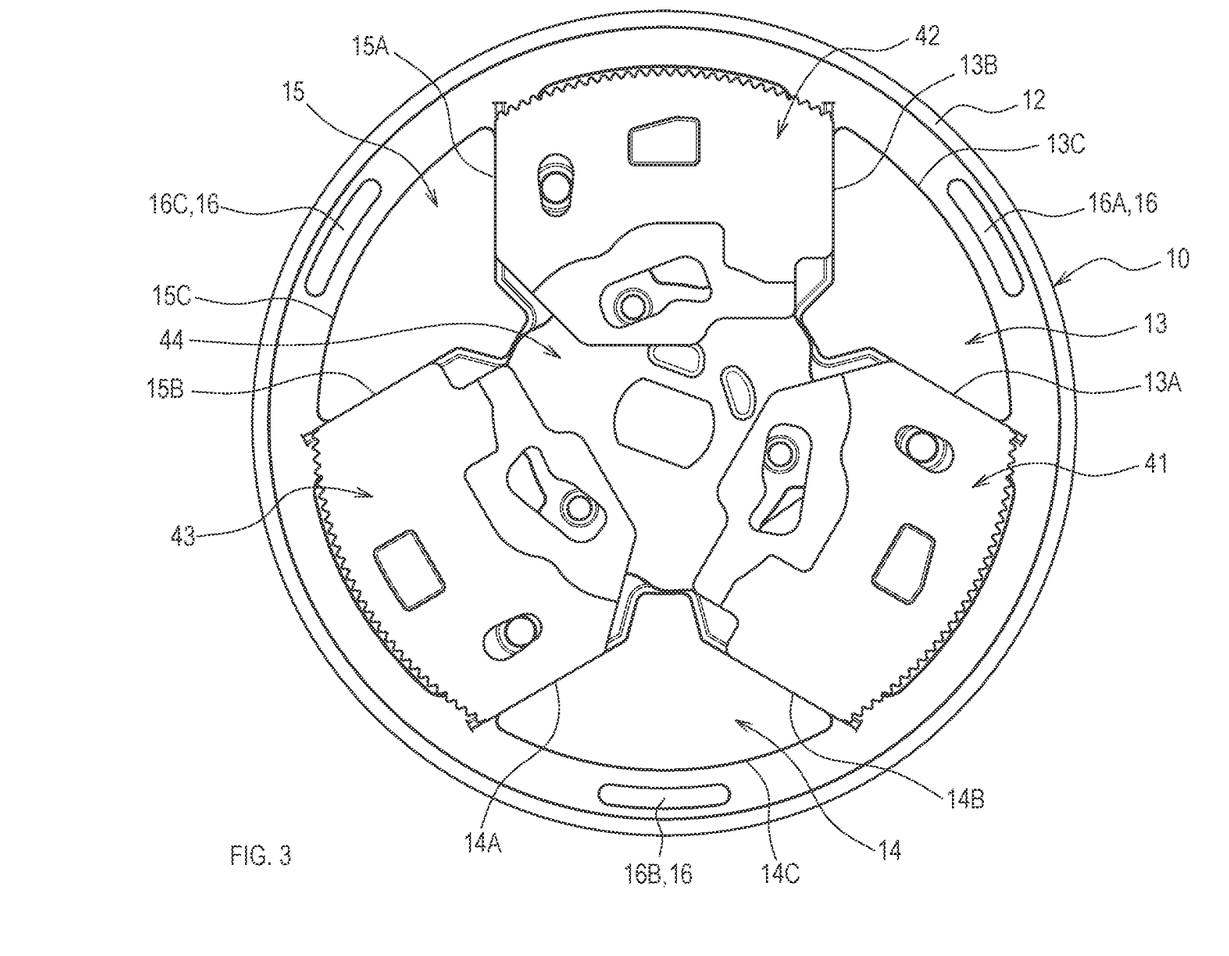
FIG. 3 is a diagram showing the structure of the recliner according to the first embodiment.

Each of the pawls 41 to 43 is housed in a space between the guide member 10 and the ratchet 20 (see FIG. 2). Specifically, as shown in FIG. 3, the pawls 41 to 43 are disposed at equal intervals (at 120-degree intervals, in the present embodiment) in the circumferential direction of the guide member 10.

In the following description, one of the pawls 41 to 43 (for example, the pawl 41) is referred to as a first pawl. The pawl adjacent to the first pawl 41 (for example, the pawl 42) in the circumferential direction is referred to as a second pawl. The pawl 43 is referred to as a third pawl.

A hinge cam 44 is configured to move the pawls 41 to 43. When the hinge cam 44 rotates upon receipt of an external operation force, the hinge cam 44 moves the serrations 41A to 43A of the pawls 41 away from the serrations 24.

Figure 4:
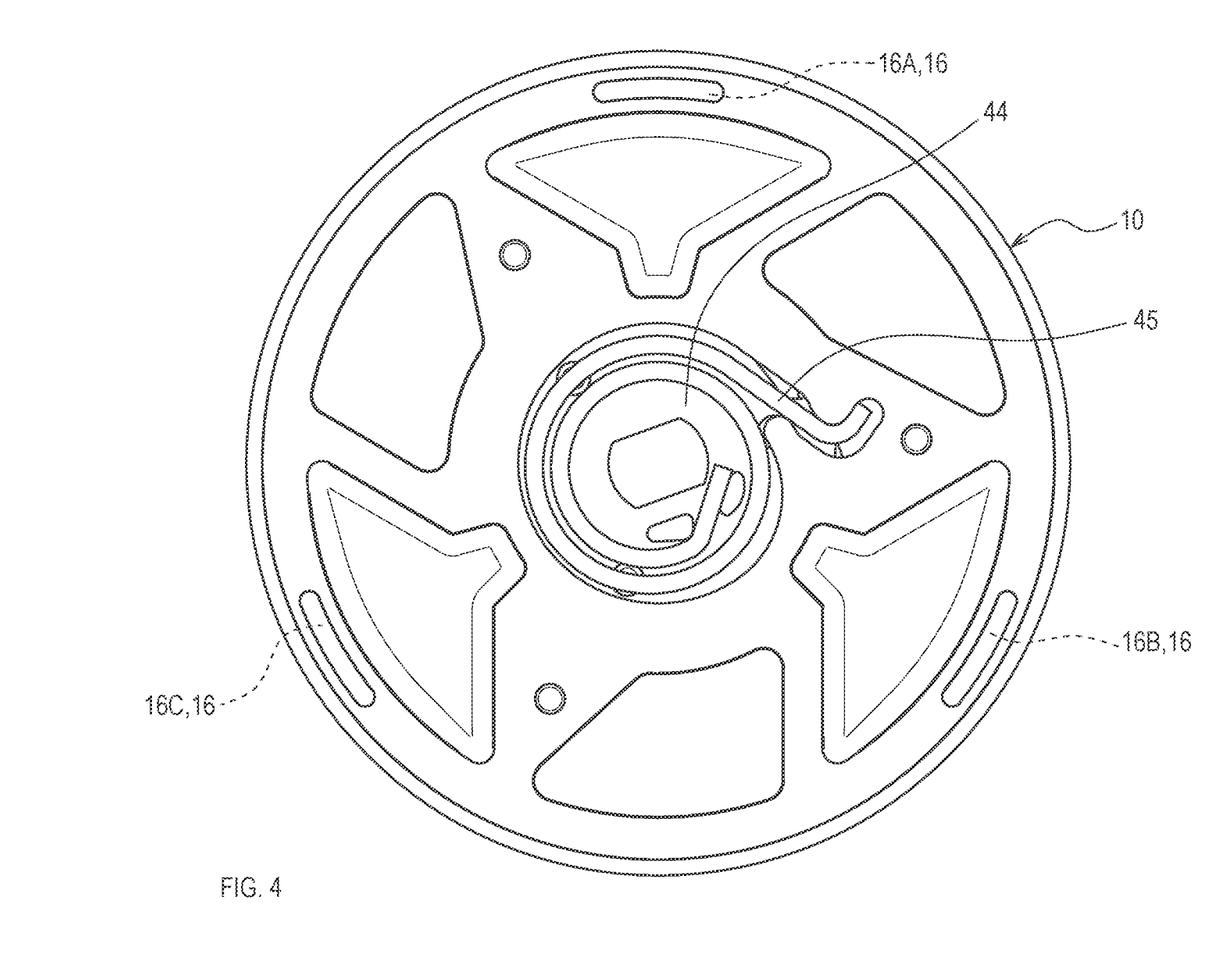
FIG. 4 is a diagram showing the structure of the recliner according to the first embodiment.

When the operation force disappears, the pawls 41 to 43 are moved to positions where the serrations 41A to 43A fit into the serrations 24 by an elastic force of a spiral spring 45 (see FIG. 4). Then, the pawls 41 to 43 are maintained at the positions by the elastic force.

2. Configuration of Guide Member

Figure 5:
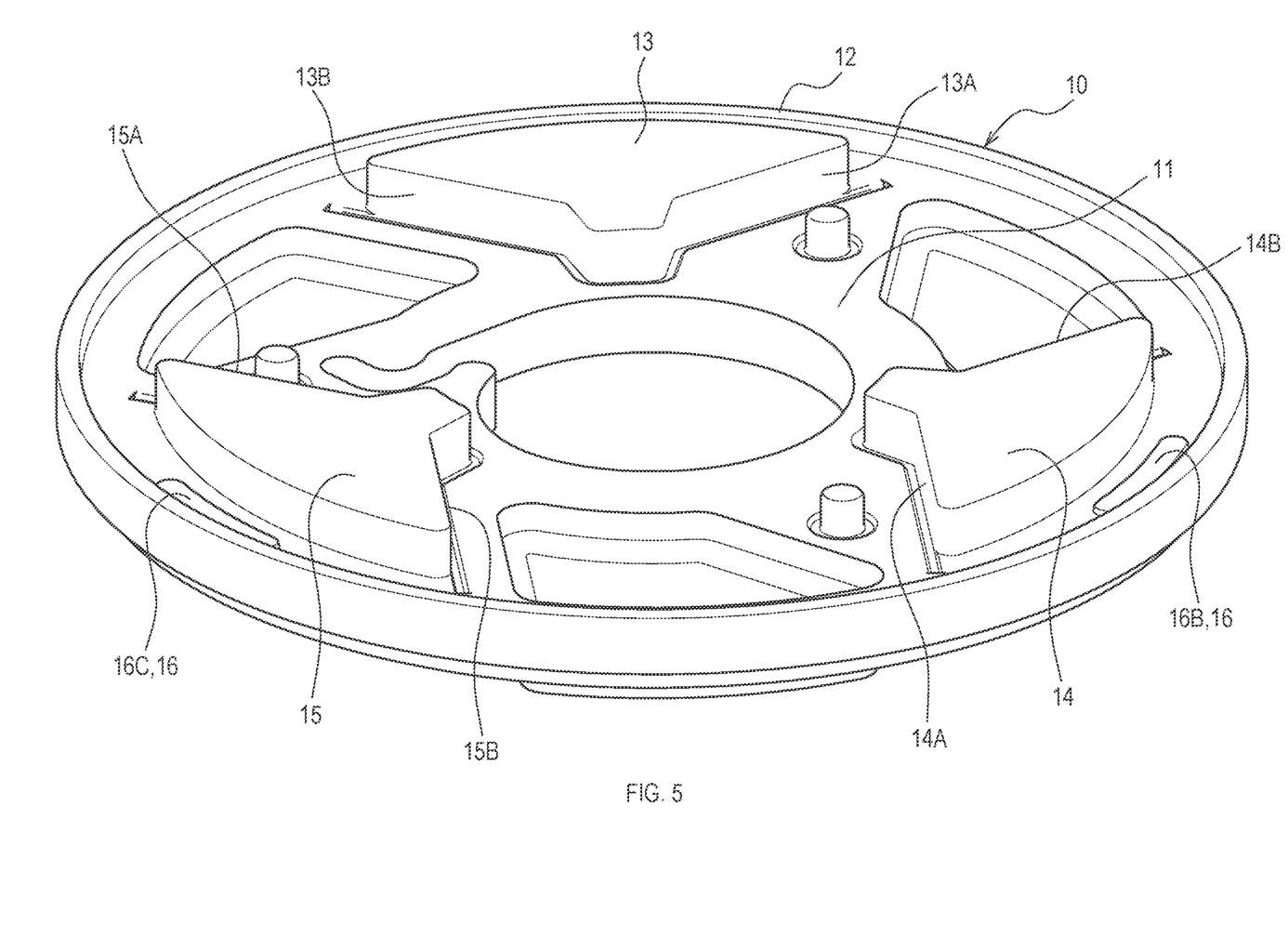
FIG. 5 is a diagram showing a guide member according to the first embodiment.

As shown in FIG. 5, protruding portions 13 to 15 are provided on the plate portion 11 to be positioned on the inner peripheral side of the flange 12. The protruding portions 13 to 15 are substantially fan-shaped portions protruding toward the plate portion 21 (the ratchet 20).

The protruding portion 13 has guide walls 13A, 13B provided on its sides. The protruding portion 14 has guide walls 14A, 14B provided on its sides. The protruding portion 15 has guide walls 15A, 15B provided on its sides.

As shown in FIG. 3, each of the guide walls 13A to 15B is formed by a wall surface extending in a direction parallel to the radial direction. Between each two guide walls facing each other among the guide walls 13A to 15B, one of the pawls 41 to 43 is disposed.

Specifically, the first pawl 41 is interposed between the guide wall 13A and the guide wall 14B. A third pawl 43 is interposed between the guide wall 14A and the guide wall 15B. A second pawl 42 is interposed between the guide wall 15A and the guide wall 13B.

The guide wall 13A and the guide wall 14B come into sliding contact with the first pawl 41, thereby guiding the movement of the first pawl 41 and restricting the first pawl 41 from moving in the circumferential direction.

The guide wall 14A and the guide wall 15B come into sliding contact with the third pawl 43, thereby guiding the movement of the third pawl 43 and restricting the third pawl 43 from moving in the circumferential direction.

As the guide wall 15A and the guide wall 13B come into sliding contact with the second pawl 42, the guide walls 15A, 13B guide the movement of the second pawl 42 and restrict the second pawl 42 from moving in the circumferential direction.

Between each two guide walls adjacent to each other in the circumferential direction, one of the ratchet seating portions 16A to 16C is provided. Specifically, the ratchet seating portion 16A is provided between the guide wall 13A and the guide wall 13B.

The ratchet seating portion 16B is provided between the guide wall 14A and the guide wall 14B. The ratchet seating portion 16C is provided between the guide wall 15A and the guide wall 15B. The ratchet seating portion 16 in the description below means the ratchet seating portions 16A to 16C.

Figure 6:
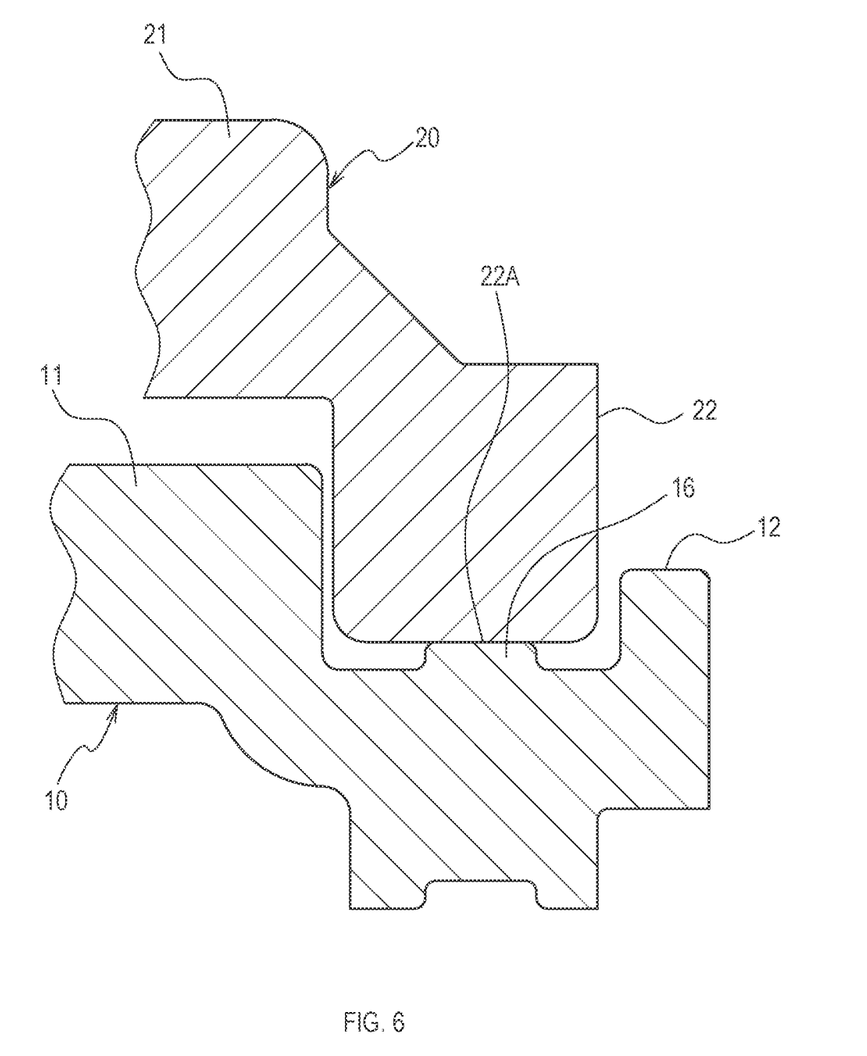
FIG. 6 is a diagram showing a ratchet seating portion of the recliner according to the first embodiment.

As shown in FIG. 6, each ratchet seating portion 16 protrudes toward the flange 22 of the ratchet 20 and can come into sliding contact with a tip 22A of the flange 22. Each ratchet seating portion 16 according to the present embodiment is integrally formed with the plate portion 11 and the flange 12 from a metal plate material by plastic forming, such as press working.

Out of the guide walls 13A to 15B, the guide wall 13A that comes into sliding contact with the first pawl 41 is referred to as a first guide wall, while the guide wall 13B that is adjacent to the first guide wall 13A and comes into sliding contact with the second pawl 42 is referred to as a second guide wall. In this case, the ratchet seating portion 16A is, as shown in FIG. 3, provided between the first guide wall 13A and the second guide wall 13B in the circumferential direction.

Specifically, the ratchet seating portion 16A is provided between the guide walls 13A, 13B of the protruding portion 13 in the circumferential direction, and has a length in the circumferential direction shorter than that of an arc 13C.

Similarly, the ratchet seating portion 16B is provided between the guide walls 14A, 14B of the protruding portion 14 in the circumferential direction, and has a length in the circumferential direction shorter than that of an arc 14C.

Similarly, the ratchet seating portion 16C is provided between the guide walls 15A, 15B of the protruding portion 15 in the circumferential direction, and has a length in the circumferential direction shorter than that of an arc 15C.

3. Features of Recliner According to Present Embodiment

Each ratchet seating portion 16 protrudes toward the flange 22 and can come into sliding contact with the tip 22A of the flange 22. The ratchet seating portions 16 are each provided on the guide member 10 to be positioned on the inner peripheral side of the flange 12 and between, among the guide walls 13A to 15B, two guide walls adjacent to each other in the circumferential direction.

This arrangement enables the ratchet 20 to be spaced apart from the pawls 41 to 43 to an extent not to interfere with the pawls 41 to 43. The guide walls 13A to 15B, thus, may have an increased height. As a result, the recliner 1 can fulfill the above-described first requirement and second requirement.

One way to increase the height of the guide walls 13A to 15B is to make either a punch component or a die component for press forming of the guide member 10 with two dies.

In the above-described way, however, a depression is formed for production reasons on a press matching part by the two metal dies, that is, on the inner peripheral surface of the flange 12. If such a depression is formed, the depression impedes the production. Accordingly, it is not possible by the above-described way to produce a recliner in which the flange 12 has a reduced width as compared to those of conventional recliners.

In contrast, the recliner 1 according to the present embodiment has the ratchet seating portions 16, which eliminates the need for making either the punch component or the die component with two metal dies. Accordingly, no depression is formed in principle in the recliner 1 due to press matching, allowing the flange 12 of the recliner 1 to have a reduced width as compared to those of conventional recliners.

Each ratchet seating portion 16 is provided between, among the guide walls 13A to 15B, two guide walls adjacent to each other in the circumferential direction. This configuration reduces the contact areas with the flange 22, as compared to a configuration where a ratchet seating portion extends along the entire circumference. As a result, the slide resistance is reduced between the ratchet (20) and the guide member 10.

For example, the ratchet seating portion 16A is provided between the first guide wall 13A and the second guide wall 13B in the circumferential direction. This arrangement reliably reduces the slide resistance between the ratchet 20 and the guide member 10.

Other Embodiments

The above-described embodiment has described the recliner in which the guide member 10 is fixed to the cushion frame while the ratchet 20 is fixed to the back frame. The present disclosure, however, is not limited to this configuration.

The recliner according to the present disclosure may be configured, for example, such that the guide member 10 is fixed to the back frame while the ratchet 20 is fixed to the cushion frame.

In the above-described embodiment, three pawls 41 to 43 are provided. The present disclosure, however, is not limited to this configuration. The pawl according to the present disclosure may be at least one, for example.

In the above-described embodiment, six guide walls are provided since the three pawls 41 to 43 are provided. The present disclosure, however, is not limited to this configuration. For one pawl, for example, two guide walls are sufficient in the present disclosure.

The ratchet seating portions 16A to 16C according to the above-described embodiment are formed into arc-shaped protrusions extending in the circumferential direction. The present disclosure, however, is not limited to this configuration. The ratchet seating portions according to the present disclosure may be formed into, for example, columnar protrusions.

The ratchet seating portions 16A to 16C according to the above-described embodiment are provided to respectively face the arcs 13C to 15C of the protruding portions 13 to 15. The present disclosure, however, is not limited to this configuration. In the present disclosure, each of the ratchet seating portions 16A to 16C may be provided, for example, between the protruding portions 13 to 15 that are adjacent to each other.

The protruding portions 13 to 15 according to the above-described embodiment are formed in an arc shape. The present disclosure, however, is not limited to this configuration. For example, the guide walls 13A to 15B may be provided as the only protrusions in the present disclosure without the protruding portions 13 to 15.

In the above-described embodiments, the recliner according to the present disclosure is applied to the vehicle seat. Application of the present disclosure, however, is not limited to this. The present disclosure may be applied to seats for vehicles, such as railroad vehicles, ships, boats, and aircrafts, as well as stationary seats for theaters, homes, and so on.

Furthermore, the present disclosure is not limited to the aforementioned embodiments as long as it accords with the spirit of the present disclosure described in the aforementioned embodiments. The present disclosure, thus, may employ a configuration obtained by combining at least two of the aforementioned embodiments, or a configuration obtained by removing any one of the constituent features of the present disclosure in the aforementioned embodiments.

The invention claimed is:

1. A recliner rotatably coupling a seatback to a seat cushion, the recliner comprising:
    a plate-shaped ratchet having a first flange on an outer periphery of the ratchet, the flange being provided with a first protrusion-depression on an inner peripheral surface of the first flange;
    at least one pawl having a second protrusion-depression that is meshable with the first protrusion-depression, the at least one pawl being configured to be movable between a meshed position and a separated position, the meshed position being where the at least one pawl meshes with the first protrusion-depression, and the separated position being spaced apart from the meshed position;
    a plate-shaped guide member having:
        two or more guide walls configured to come into sliding contact with the at least one pawl so as to guide a movement of the at least one pawl and so as to restrict the at least one pawl from moving in a circumferential direction; and
        a second flange provided on an outer periphery of the guide member and protruding toward the ratchet; and
    a ratchet seating portion protruding toward the first flange and being configured to come into sliding contact with a tip of the first flange, the ratchet seating portion being provided on the guide member to be positioned on an inner peripheral side of the second flange, and the ratchet seating portion being provided between, among the two or more guide walls, two guide walls adjacent to each other in the circumferential direction.

2. The recliner according to claim 1,
wherein the at least one pawl comprises two or more pawls,
wherein the two or more pawls are disposed at equal intervals in the circumferential direction,
wherein the two or more pawls comprise:
    a first pawl; and
    a second pawl adjacent to the first pawl in the circumferential direction,
wherein the two or more guide walls comprise:
    a first guide wall configured to come into sliding contact with the first pawl; and
    a second guide wall disposed adjacent to the first guide wall and configured to come into sliding contact with the second pawl, and
wherein the ratchet seating portion is provided between the first guide wall and the second guide wall in the circumferential direction.

* * * * *